US010611278B2

(12) United States Patent
Pardue et al.

(10) Patent No.: US 10,611,278 B2
(45) Date of Patent: Apr. 7, 2020

(54) LATTICES FOR USE IN AIRCRAFT SEAT ASSEMBLIES

(71) Applicant: B/E Aerospace, Inc., Wellington, FL (US)

(72) Inventors: Tyler N. Pardue, Cary, NC (US); Ryan J. Suhre, Winston-Salem, NC (US); Daniel I. Udriste, Winston-Salem, NC (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 85 days.

(21) Appl. No.: 15/825,981

(22) Filed: Nov. 29, 2017

(65) Prior Publication Data

US 2019/0160989 A1    May 30, 2019

(51) Int. Cl.
| | |
|---|---|
| *B60N 2/64* | (2006.01) |
| *B64D 11/06* | (2006.01) |
| *B33Y 10/00* | (2015.01) |
| *B29C 64/10* | (2017.01) |
| *B33Y 80/00* | (2015.01) |
| *B29L 31/30* | (2006.01) |
| *B29L 31/58* | (2006.01) |

(52) U.S. Cl.
CPC ............ *B60N 2/64* (2013.01); *B29C 64/10* (2017.08); *B33Y 10/00* (2014.12); *B33Y 80/00* (2014.12); *B64D 11/06* (2013.01); *B29L 2031/3076* (2013.01); *B29L 2031/58* (2013.01)

(58) Field of Classification Search
None
See application file for complete search history.

(56) References Cited

U.S. PATENT DOCUMENTS

| | | | |
|---|---|---|---|
| 9,415,562 B1 * | 8/2016 | Schaedler | B81C 1/00126 |
| 2005/0025953 A1 * | 2/2005 | Hetzel | A47C 31/126 |
| | | | 428/304.4 |
| 2016/0325520 A1 * | 11/2016 | Berger | B32B 3/12 |

* cited by examiner

*Primary Examiner* — Chinessa T. Golden
(74) *Attorney, Agent, or Firm* — Clements Bernard Walker (57) ABSTRACT

Cushion components for use in an aircraft and methods of making thereof. The cushion components having a lattice that is open celled, breathable, and has a compressibility profile that mimics an indentation load deflection (ILD) and spring rate of foam. In certain aspects, the elastomeric lattice is formed of interconnected cuboid structures that include, for example, interconnected face-centered cube (FCC) structures, interconnected body-centered cube (BCC) structures, or interconnected kagome structures.

11 Claims, 12 Drawing Sheets

Data Comparison For Foams and Lattices

| Foam/Lattice | Unit Cell Parameter (in) | Rod Thickness (in) | Density (pcf) | Modulus of Elasticity (Initial Slope) | Compressive Yield Strength (lbs) | Modulus per Density | Yield Stress per Density |
|---|---|---|---|---|---|---|---|
| HR-2855 | | | 2.68 | 0.366 | 2.30 | 0.137 | 0.858 |
| BCC1 | 0.2 | 0.02 | 4.10 | 0.814 | 3.06 | 0.249 | 1.304 |
| KG2 (z-axis) | 0.2 | 0.03 | 4.75 | 0.361 | 3.06 | 0.076 | 0.645 |
| HR-70 | | | 2.94 | 0.731 | 3.83 | 0.198 | 0.747 |
| FCCA | 0.25 | 0.02 | 5.18 | 0.793 | 3.83 | 0.153 | 0.739 |
| HR-32 | | | 2.59 | 0.145 | 1.53 | 0.056 | 0.591 |
| FCC4 | 0.4 | 0.03 | 4.75 | 0.364 | 2.30 | 0.077 | 0.484 |
| KG4 (z-axis) | .25 | .03 | 2.59 | 0.166 | 0.77 | 0.064 | 0.296 |
| KG4 (x-axis) | .25 | .03 | 2.59 | 0.401 | 1.53 | 0.155 | 0.591 |
| KG4 (y-axis) | .25 | .03 | 2.59 | 0.102 | 0.77 | 0.039 | 0.296 |

LATTICES FOR USE IN AIRCRAFT SEAT ASSEMBLIES

BACKGROUND

Various foams are currently used in aircraft seat assemblies to serve various purposes. These foams have differing durometers, cell densities, and load deflection. Furthermore, these different foams may be cut, stacked, adhered together, and further formed to suit specific purposes within the aircraft seat assembly.

For example, aircraft seat cushions utilize a plurality of different foams that are stacked and adhered together in order to create desired compression profiles commonly referred to as indentation load deflection (ILD) profiles within the industry. Specifically, these aircraft seat cushion foam arrangements include an outermost foam layer that is resiliently deformable, i.e. having a high degree of compressibility and spring rate. This outermost foam layer is stacked on and adhered to one or more foam layers that form the inner foam layer(s) of the aircraft seat cushion. These inner foam layer(s) are more rigid and far less deformable than the outermost foam layer thereby providing support to the overall foam layer stack, which further aids in achieving the desired compression profile/ILD profile for the aircraft seat cushion.

While the above mentioned foams are commonly used for various purposes in aircraft seat assemblies, numerous problems exist. Specifically, there is added time, expense, and increased margin for error associated with intricately stacking and adhering a plurality of different foam layers together and subsequently forming these adhered foam layers into a desired article (e.g., an aircraft seat cushion). Furthermore, the above mentioned foam stacks can be, in certain instances, quite heavy, which further leads to cumbersome handling and installation of these articles within an aircraft.

In addition to the added time and expense associated with stacking a plurality of different foam layers together and subsequently forming and installing the desired article within the aircraft, these foams are not very breathable often having poor ventilation in which odors can become easily trapped post-installation and post-use within the aircraft. These foams further have poor heat transfer capacity. Both poor breathability and poor heat transfer capacity can lead to aircraft passenger displeasure when the passenger is in contact with the aircraft seating assembly for prolonged time periods. Thus, problems clearly exist with the currently used foams and foam stacks in aircraft seating assemblies.

SUMMARY

Disclosed herein are rigid or elastomeric lattices that advantageously mimic compression profiles of foams while concurrently avoiding problems commonly associated with these foams (e.g., necessity to stack and adhere a plurality of different foams together, lack of breathability, poor heat transfer capacity, etc.). Specifically, these lattices have a lighter weight than conventional foam stacks, are far more breathable, and have excellent heat transfer capacity. As disclosed further below, these lattices may be formed into articles (e.g., seat cushions, video bezels, etc.) used in an aircraft seating assembly, and characteristics of these lattices advantageously allow for easier handling during installation in an aircraft seating assembly and further advantageously provides an aircraft passenger a more pleasurable experience when compared to similar articles formed of foams or foam stacks.

In certain aspects, disclosed is a three-dimensionally printed (3-D printed) cushion component for use in an aircraft passenger seat including a resiliently deformable elastomeric lattice that is open celled and breathable, the resiliently deformable elastomeric lattice having a compressibility profile including a modulus of elasticity ranging from 0.1 to 0.8 and a compressive yield strength ranging from 0.35 kilograms (~0.75 lbs) to 1.8 kilograms (~4.0 lbs) that mimics foam.

In certain aspects, the resiliently deformable elastomeric lattice of the 3-D printed cushion component is a continuous (unitary) layer comprised of a plurality of stacked and interconnected cuboid structures.

In certain aspects, each cuboid structure of the plurality of stacked and interconnected cuboid structures has a unit cell length ranging from 0.4 cm to 1.15 cm.

In certain aspects, each cuboid structure of the plurality of stacked and interconnected cuboid structures includes interconnected struts each having a diameter from 0.04 cm to 0.09 cm.

In certain aspects, each cuboid structure of the plurality of stacked and interconnected cuboid structures comprises at least one of a face-centered cube structure, a body-centered cube structure, and a kagome structure.

In certain aspects, the resiliently deformable elastomeric lattice is anisotropic having greater strength throughout an entire first axial plane as compared to at least one other axial plane thereof.

In certain aspects, the resiliently deformable elastomeric lattice is continuous and has a uniform compressibility profile along at least one axis thereof.

In certain aspects, the resiliently deformable elastomeric lattice is continuous and has a graduated compressibility profile along at least one axis thereof.

In certain aspects, the 3-D printed cushion component is included in a aircraft passenger seat or in a video bezel.

In certain aspects, disclosed is a method of making a cushion component for use in an aircraft seat assembly including printing a three-dimensional lattice such that the three-dimensional lattice is open celled, breathable, and has a compressibility profile that mimics the modulus of elasticity and compressive yield strength of open-celled foam.

In certain aspects, in the modulus of elasticity of the three-dimensional lattice ranges from 0.1 to 0.8.

In certain aspects, the compressive yield strength ranges from 0.35 kilograms (~0.75 lbs) to 1.8 kilograms (~4.0 lbs).

In certain aspects, the three-dimensional lattice includes a plurality of stacked and interconnected cuboid structures.

In certain aspects, each cuboid structure of the plurality of the stacked and interconnected cuboid structures has a unit cell length ranging from 0.4 cm to 1.15 cm.

In certain aspects, each cuboid structure of the plurality of the stacked and interconnected cuboid structures comprises interconnected struts with each strut having a diameter ranging from 0.04 cm to 0.09 cm.

In certain aspects, each cuboid structure of the plurality of the stacked and interconnected cuboid structures comprises at least one of a face-centered cube structure, a body-centered cube structure, and a kagome structure.

In certain aspects, the three-dimensional lattice is continuous and has a uniform compressibility profile along at least one axis thereof.

In certain aspects, the three-dimensional lattice is continuous and has a graduated compressibility profile along at least one axis thereof.

In certain aspects, the three-dimensional lattice is an elastomeric lattice and is anisotropic having greater strength throughout an entire first axial plane compared to other axial planes of the elastomeric lattice.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Referring to FIGS. 1-6, and 13-15, disclosed herein are rigid or elastomeric lattices 100, 200, 300, 400 that are three-dimensionally printed and are used as cushion components in aircraft seat assemblies. The lattices and cushion components disclosed herein advantageously mimic compression profiles of conventional foams (e.g., open-celled foams) while concurrently avoiding the problems commonly associated with conventional foams (e.g., necessity to stack and adhere a plurality of different foams together, lack of breathability, poor heat transfer capacity, etc.).

Specifically, these lattices 100, 200, 300 have a lighter weight than conventional foam stacks, are far more breathable, and have excellent heat transfer capacity, thus providing an aircraft passenger with a more pleasurable experience when in prolonged contact with cushion components that include these lattices when compared to similar articles formed of conventional foams and conventional foam stacks.

Figure 1:
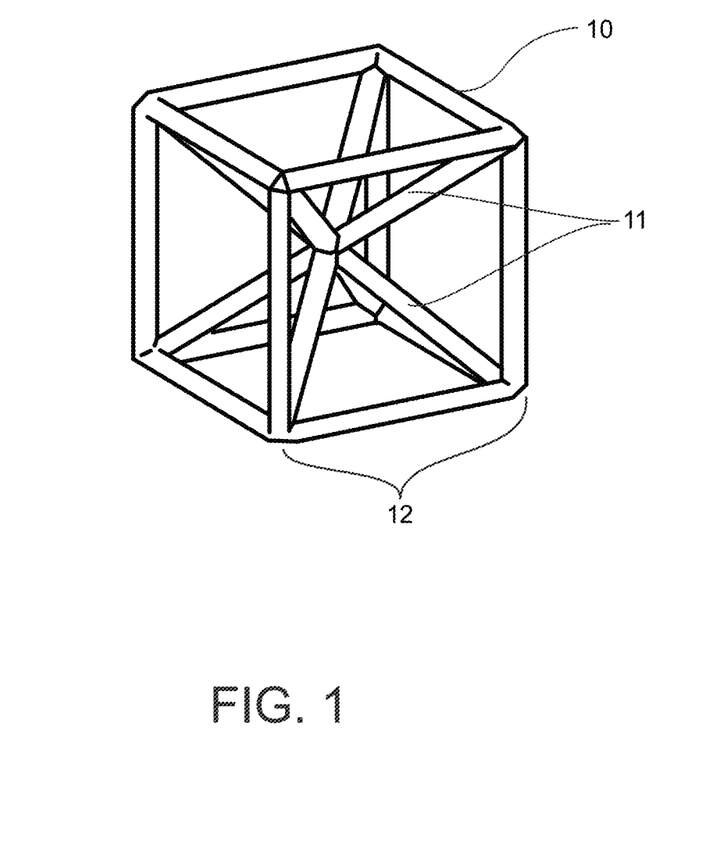
FIG. 1 depicts a single, body-centered cube (BCC) structure.
Figure 3:
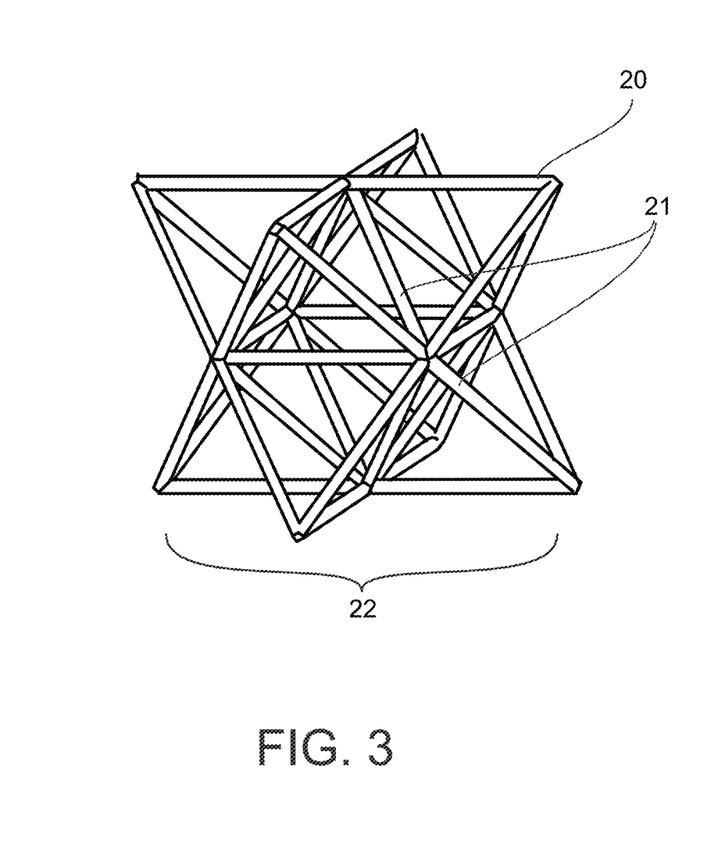
FIG. 3 depicts a single, face-centered cube (FCC) structure.
Figure 5:
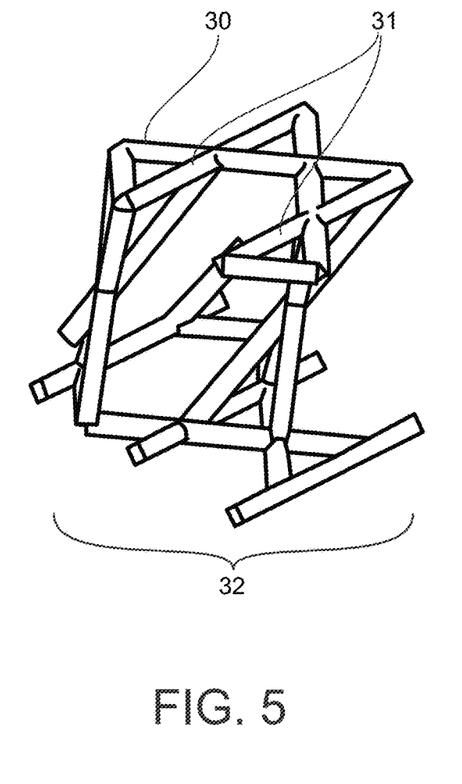
FIG. 5 depicts a single, kagome cube structure.

These lattices 100, 200, 300 may be elastomeric or rigid according to the desired use of the cushion component in the aircraft seat assembly, and these lattices 100, 200, 300 are formed from a plurality of stacked and interconnected cuboid structures 10, 20, 30. Referring to FIGS. 1, 3, and 5, these cuboid structures include a body-centered cube structure (BCC) 10, a face-centered cube structure (FCC) 20, and a kagome structure 30. As further shown in FIGS. 1, 3, 5, and 11, each cuboid structure 10, 20, 30 is formed by a plurality of interconnected struts 11, 21, 31 with each strut having a diameter ranging from 0.04 cm to 0.09 cm. As further shown in FIGS. 1, 3, 5, and 11, each cuboid structure also has a unit cell length 12, 22, 32 ranging from 0.4 cm to 1.15 cm that defines the width of each cuboid shape structure and further provides the resiliently deformable characteristics and/or resistance to permanent deformation to the lattices formed from these structures.

It should be noted that varying cell unit length and/or varying strut diameter increases or decreases rigidity of the cuboid structure thereby allowing for lattice elasticity and compressive yield strength to be varied in order to mimic a compression profile (e.g., ILD) of conventional foams currently used in cushion components in an aircraft seat assemblies. Furthermore, these cuboid structures and lattices are formed from three dimensionally printed and cured polyurethane resins in which rigidity and elasticity of the cuboid structures (and lattices formed therefrom) may be further increased or decreased by altering cure times and/or chemical components (e.g., altering ratios of hydroxyl groups to isocyanate groups) in the polyurethane resin.

Figure 2:
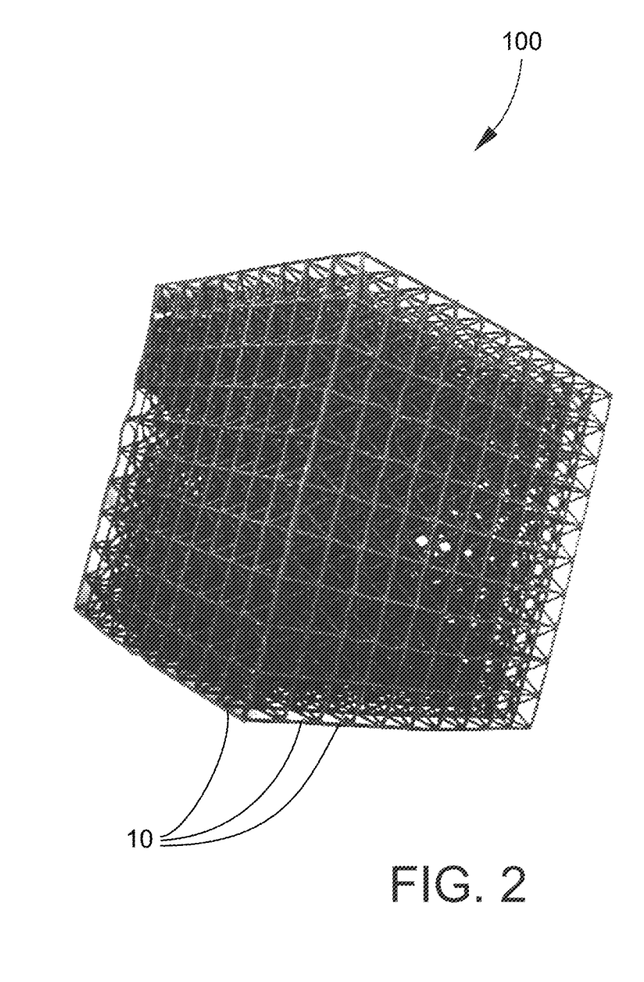
FIG. 2 depicts a lattice structure comprised of a plurality of stacked and interconnected BCC structures.
Figure 4:
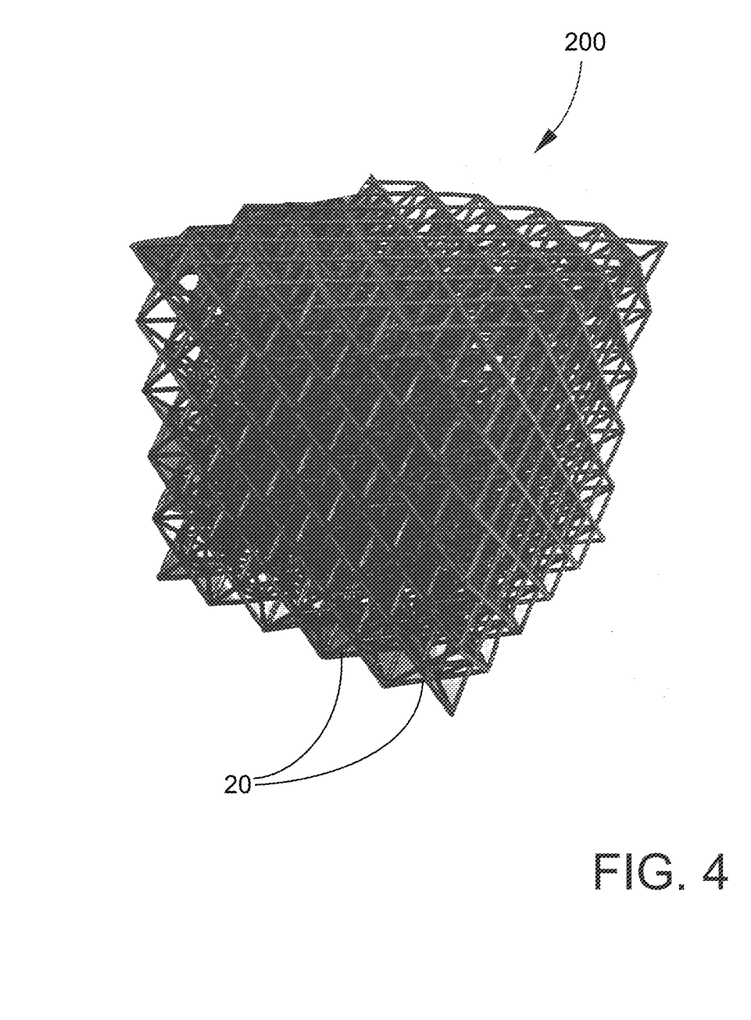
FIG. 4 depicts a lattice structure comprised of a plurality of stacked and interconnected FCC structures.
Figure 6:
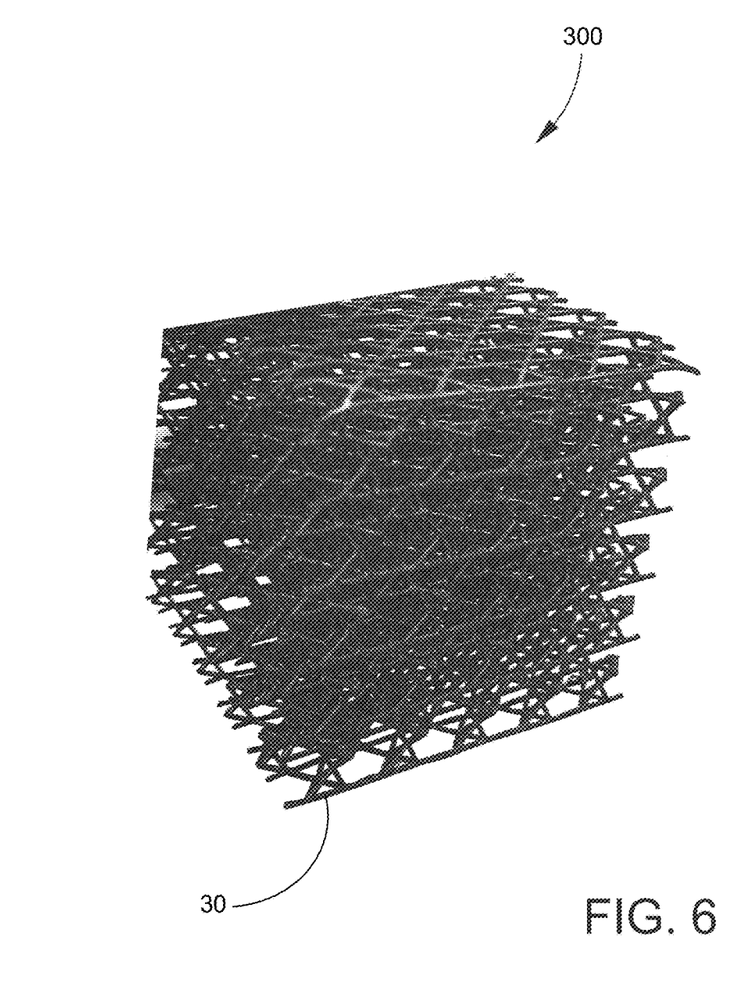
FIG. 6 depicts a lattice structure comprised of a plurality of stacked and interconnected kagome structures.
Figure 13:
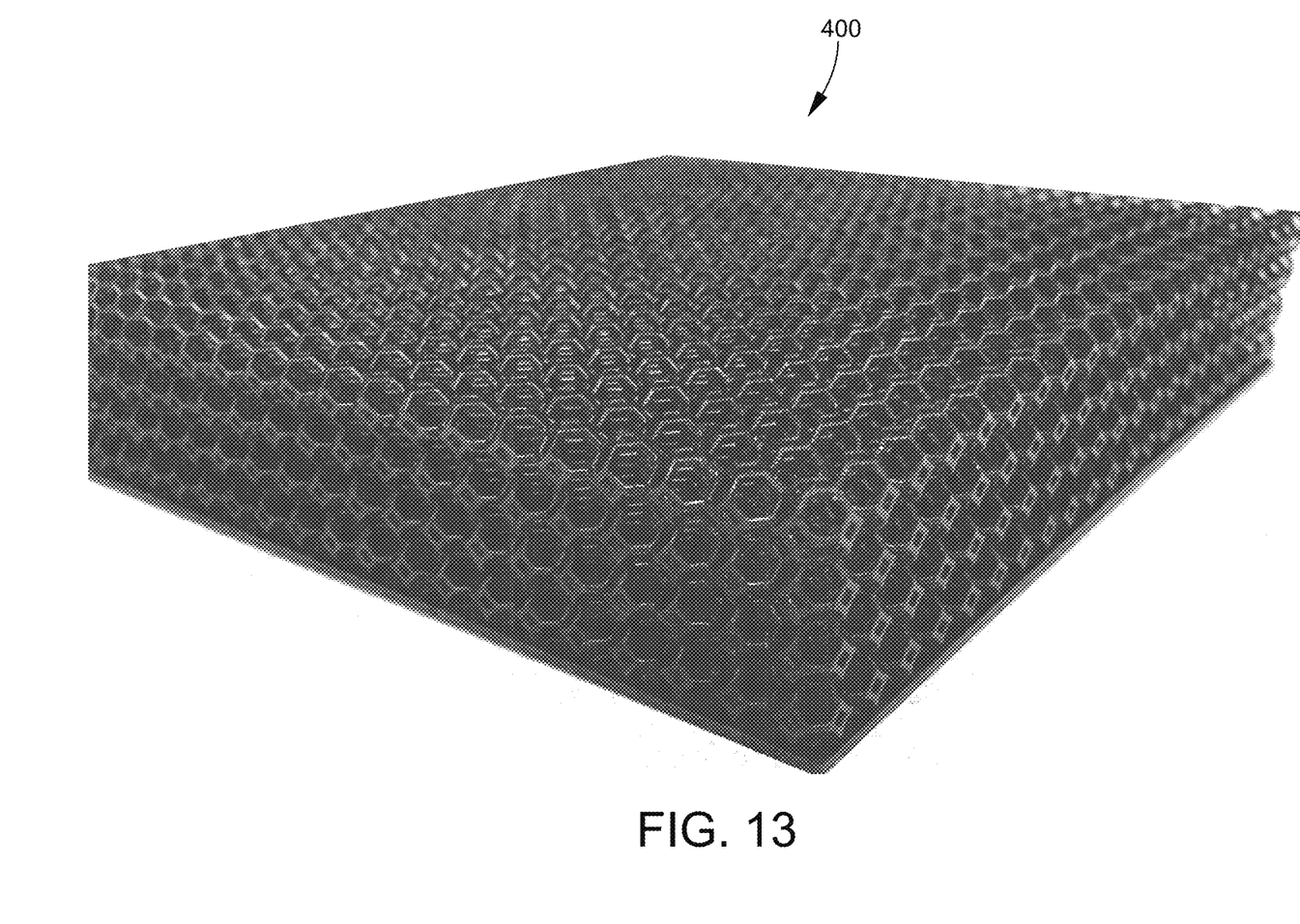
FIG. 13 depicts a lattice structure comprised of interconnected tetrakaidecahedron structures (Kelvin Cells)

As shown in FIGS. 2, 4, and 6, these lattices 100, 200, 300 are formed by three dimensionally printing a plurality of interconnected cuboid structures 10, 20, 30. For example, FIG. 2 depicts a first lattice that is formed by 3-D printing a plurality of stacked and interconnected BCC structures 10. Similarly, FIG. 4 depicts a second lattice formed by 3-D printing a plurality of stacked and interconnected FCC structures 20. Likewise, FIG. 6 depicts a third lattice form by 3-D printing a plurality of stacked and interconnected kagome structures 30. As discussed further below and because of the resiliently deformable properties, lattices 100, 200, 300 can be used in an aircraft seat cushion. However, in certain aspects, lattice rigidity may be increased for other desired uses in the aircraft seat assembly. For example, FIG. 13 depicts an alternative lattice 400 formed by a plurality of interconnected tetrakaidecahedron structures (Kelvin Cells), which is more rigid than lattices 100, 200, 300 and can be used in video bezels and other more rigid applications in an aircraft seat assembly.

Figure 7:
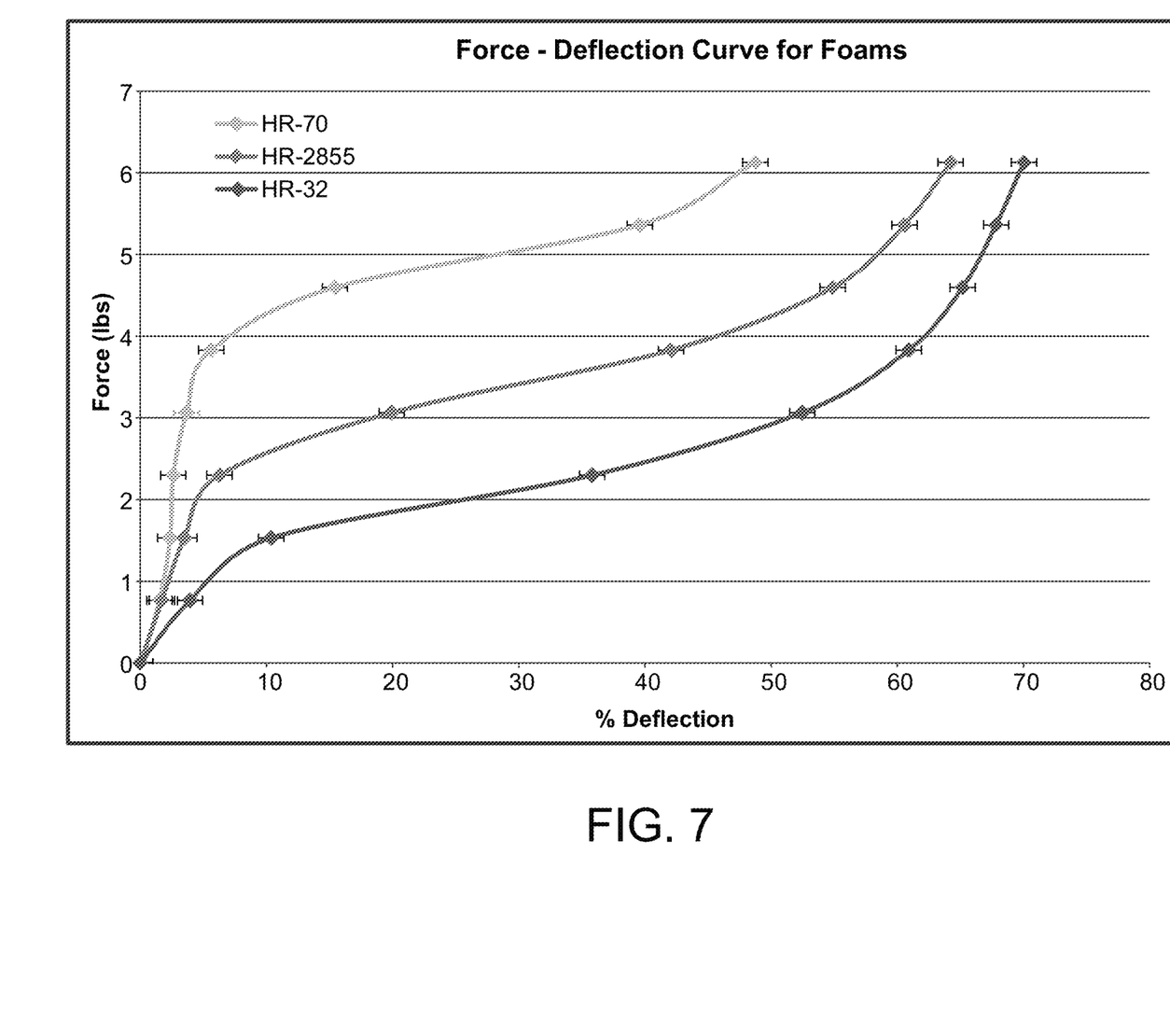
FIG. 7 depicts force-deflection curves for conventional foams (HR-70, HR-2855, and HF-32) used in aircraft seat assemblies.
Figure 10:
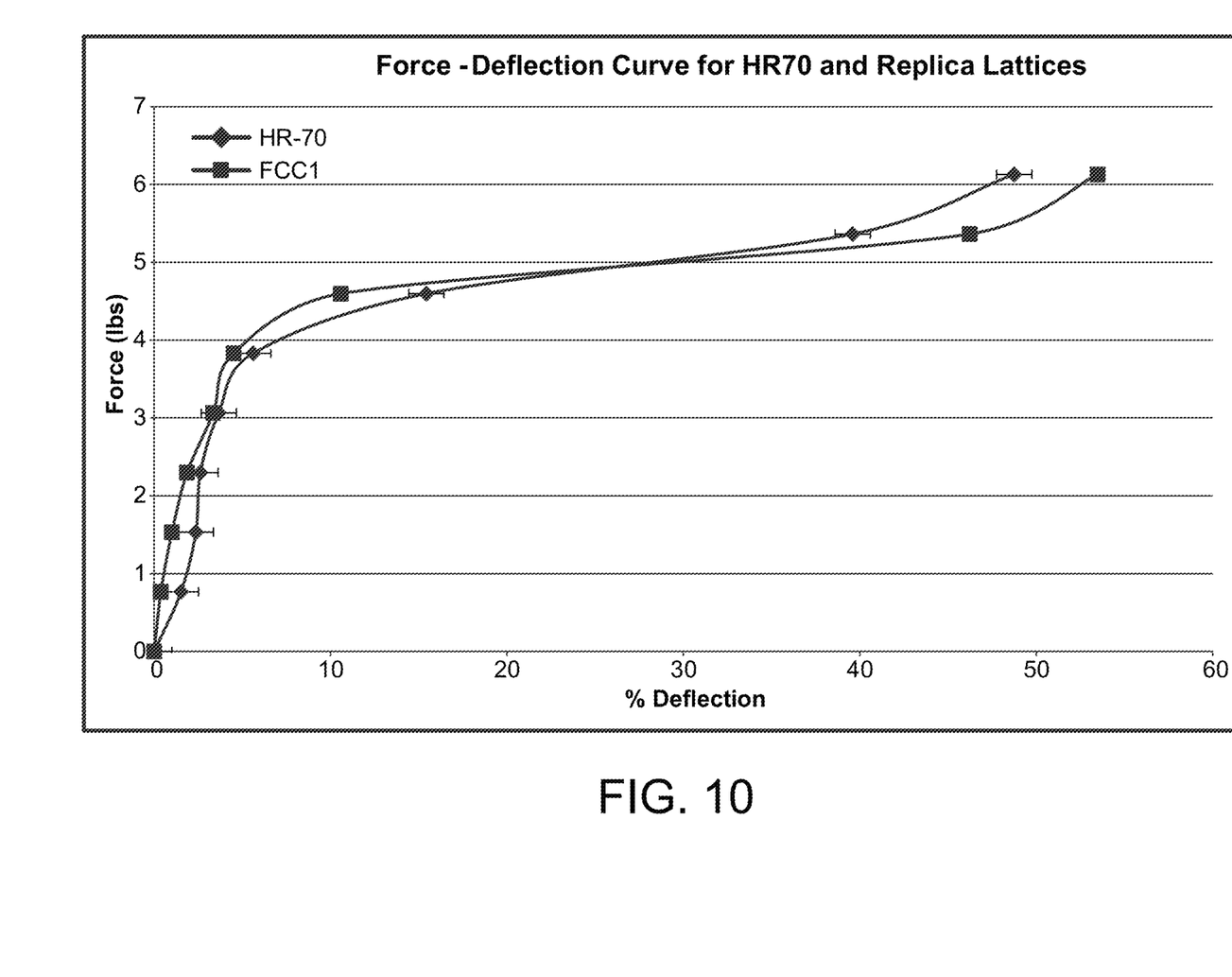
FIG. 10 depicts force-deflection curves for the HR-70 foam versus a lattice formed from interconnected FCC cube structures.
Figure 11:
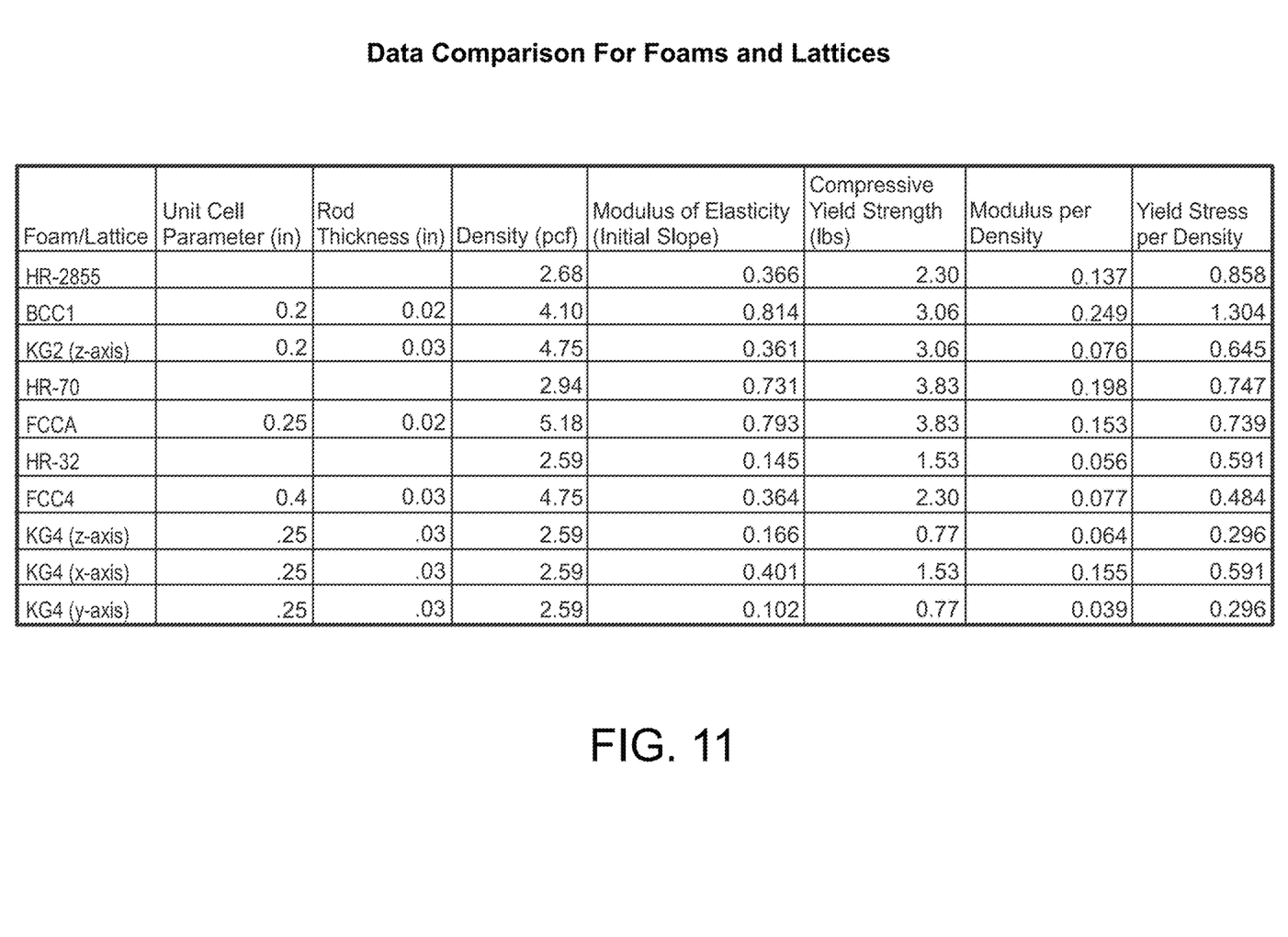
FIG. 11 is a data comparison between conventional foams (HR-70, HR-2855, and HF-32) and lattices formed from interconnected FCC, BCC, and kagome structures respectively.

As further shown in FIG. 11, the above disclosed lattices 100, 200, 300, have compressibility profiles that include a modulus of elasticity ranging from 0.1 to 0.8 and a compressive yield strength ranging from 0.35 kilograms to 1.8 kilograms, each of which mimic conventional foams. These lattices further include a modulus per density ranging from 0.039 to 0.25 and a yield stress per density ranging from 0.28 to 1.3. FIG. 7 further depicts force-deflection curves for conventional foams (HR-70, HR-2855, and HF-32) currently used in aircraft seat assemblies while FIGS. 8-10 depict comparative force deflection curves between these conventional foams and the lattices 100, 200, 300 disclosed herein.

Figure 8:
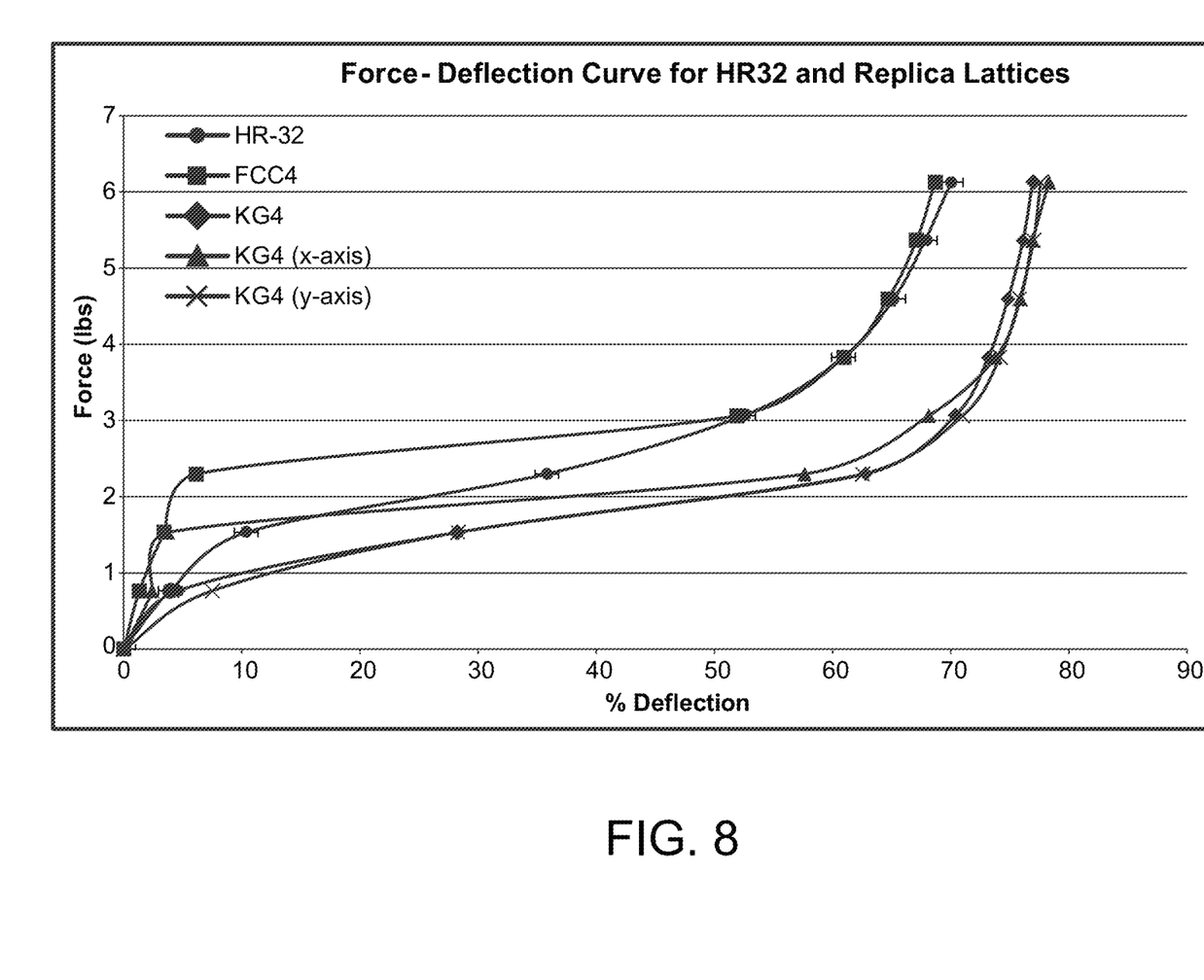
FIG. 8 depicts force-deflection curves for the HR-32 foam versus lattices formed from interconnected FCC or kagome structures respectively.
Figure 9:
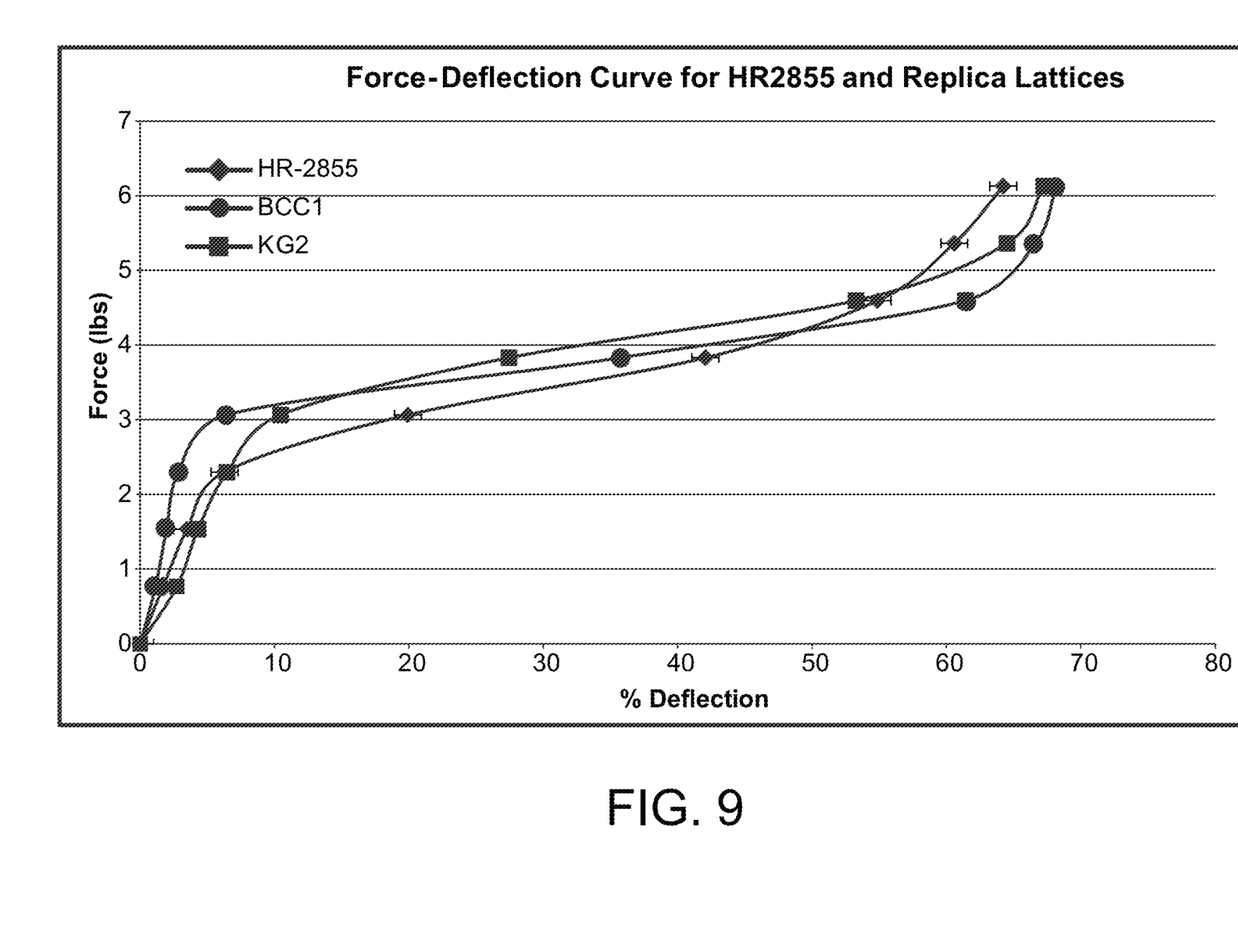
FIG. 9 depicts force-deflection curves for the HR-2855 foam versus lattices formed from interconnected BCC or kagome structures respectively.

As shown in FIGS. 8-10, the lattices 100, 200, 300 disclosed herein achieve similar, if not identical, percent deflection as conventional foams when under the same conditions, thus evidencing that lattices 100, 200, 300 (and 400) formed from cuboid structures 10, 20, 30 behave similarly, if not identically to conventional foams having different compression profiles when subjected to the same test conditions. Specifically referring to FIG. 8, FIG. 8 depicts a force deflection curve between conventional HR32 foam, a lattice formed from interconnected FCC structures (termed "FCC4" in FIG. 8), and a lattice formed from interconnected kagome structures (formed "KG4" in FIG. 8). Referring to FIG. 9, FIG. 9 depicts a force deflection curve between conventional HR2855 foam, a lattice formed from interconnected BCC structures (termed "BCC1" in FIG. 9), and a lattice formed from interconnected kagome structures (formed "KG2" in FIG. 9). Referring to FIG. 10, FIG. 10 depicts a force deflection curve between conventional HR70 foam and a lattice formed from interconnected FCC structures (termed "FCC1" in FIG. 10).

Figure 12:
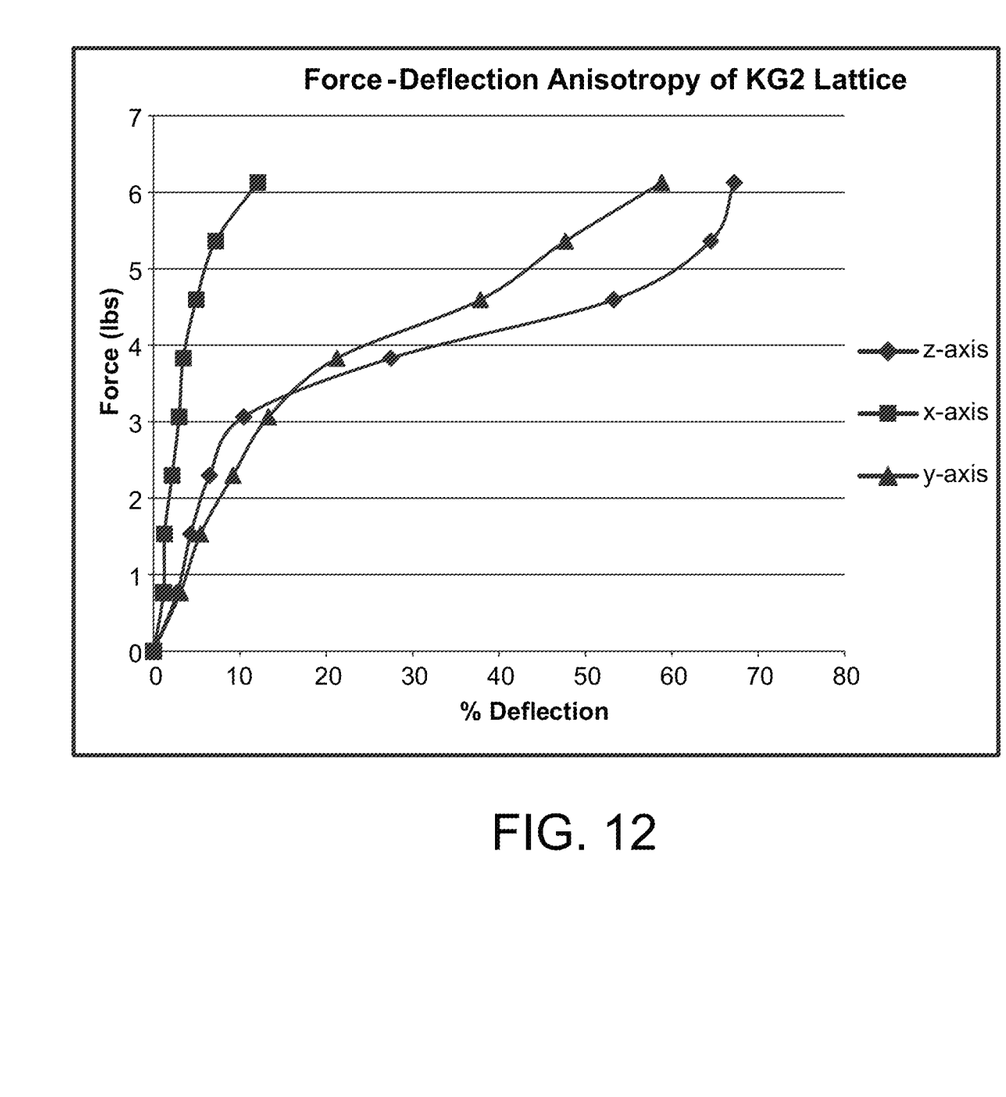
FIG. 12 depicts the anisotropic force-deflection of a lattice formed from interconnected kagome structures.

In certain aspects, the lattices 100, 200, 300, 400 have a uniform compressibility profile along at least one axis thereof, and in certain aspects, the lattices have a uniform compressibility throughout all axes. In other aspects, the lattices 100, 200, 300, 400 have a graduated compressibility profile along at least one axis thereof. For example, the lattices can have a graduated compressibility throughout its x-, y-, or z-axis (i.e., in a length-wise, width-wise, or thickness-wise direction of the lattice). In other aspects and as further shown in FIGS. 8 and 12, the lattice can be anisotropic having greater strength throughout an entire first axial plane when compared to other axial planes thereof. As specifically shown in FIGS. 8, 11, and 12, the lattice 300 formed of interconnected kagome structures 30 surprisingly exhibited anisotropic characteristics having greater strength throughout its x-axis when compared with its y- or z-axes.

Figure 14:
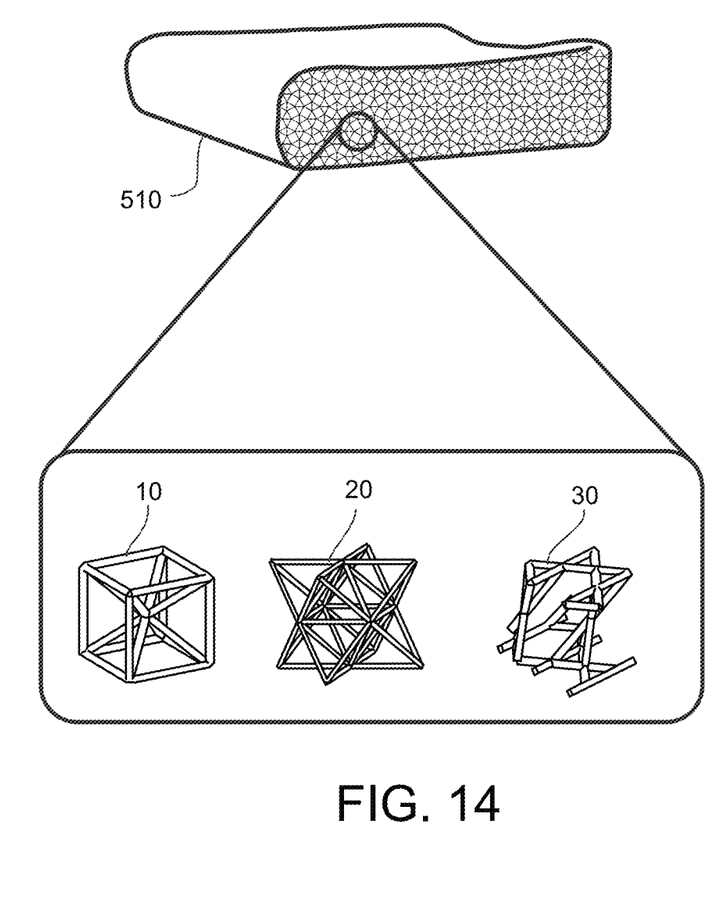
FIG. 14 depicts a perspective view of an aircraft seat cushion formed from lattices formed from various interconnected cuboid shapes.
Figure 15:
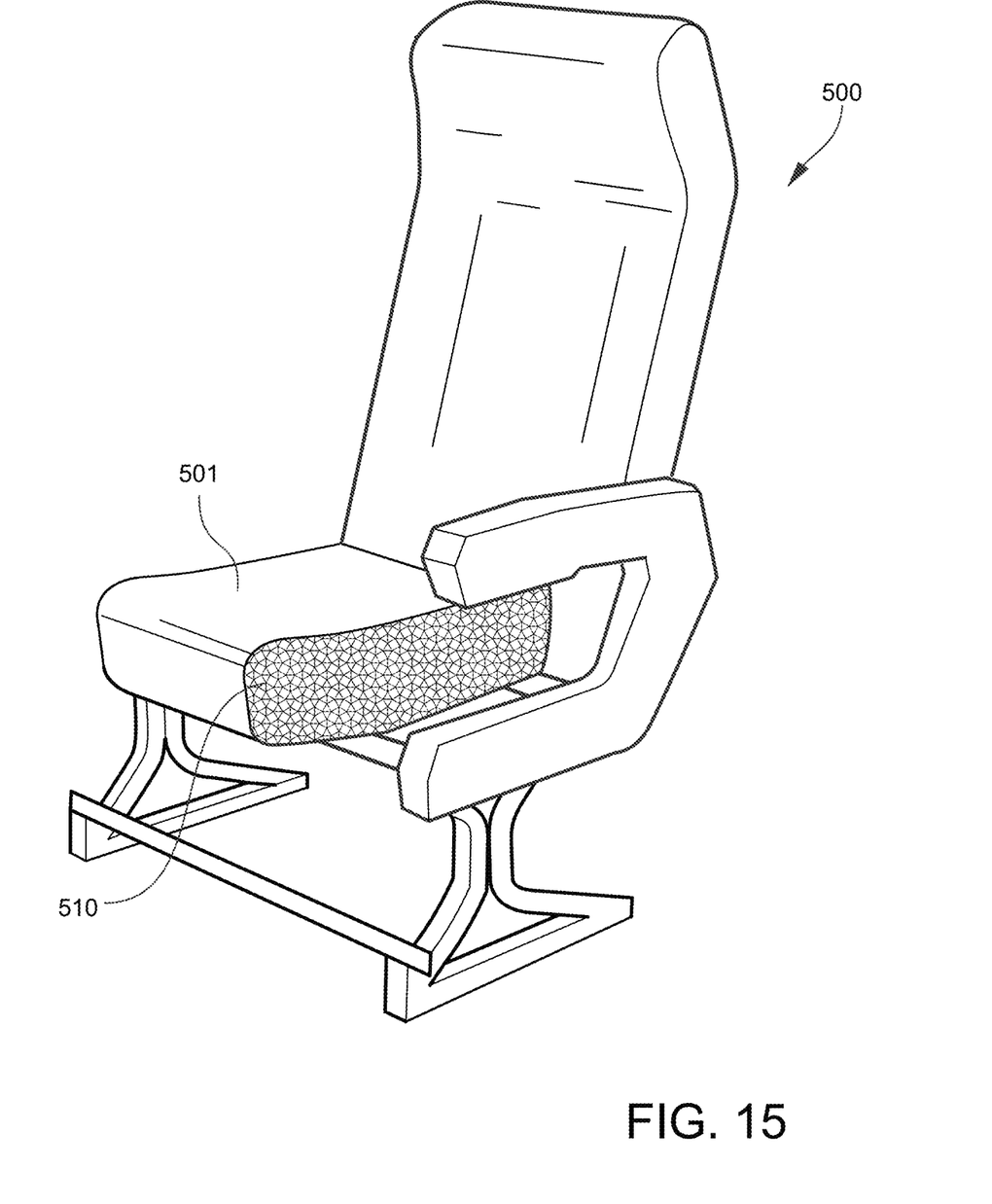
FIG. 15 depicts a cut-away view of the aircraft seat cushion.

As alluded to above and in certain aspects, the lattices 100, 200, 300, 400 are continuous layers that may be formed into desired cushion components in the aircraft seat assembly. For example, FIGS. 14 and 15 depict an aircraft seat cushion 501 and an aircraft seat 500 respectively. The seat cushion 501 includes a continuous lattice 510 shaped into the form of a seat cushion and covered along its periphery with upholstery. As further shown in FIG. 14 the lattice of seat cushion 501 is formed from the above described interconnected cuboid structures 10, 20, 30 respectively. The continuous lattice 510, includes a predetermined arrangement of cuboid shapes 10, 20, 30 that cooperatively interact to provide a predetermined compression profile, resiliency, and structural support.

In certain aspects, seat cushion 501, and more particularly lattice 510, compresses according to a predetermined profile and/or in a predetermined direction. In certain aspects, the compression profile of the aircraft seat cushion 501, and more particularly the continuous lattice 510, is more resistant to compression the further that it is compressed. This configuration also provides structural support to the bottom of the seat cushion so as to decrease the impulse load to an occupant's lumbar region.

In another embodiment, a continuous lattice 400 formed by a plurality of interconnected tetrakaidecahedron structures (Kelvin Cells) can be used to form a head injury compliant (HIC) compliant video bezel or other rigid articles in an aircraft passenger seat assembly As discussed above, the lattices 100, 200, 300, 400 disclosed herein can be continuous layers that are formed into articles (seat cushions, video bezels, etc.) disclosed herein. These continuous layers and articles are advantageously lighter weight than conventional foam stacks, are far more breathable, and have excellent heat transfer capacity, thus providing an aircraft passenger with a more pleasurable experience when in prolonged contact with the disclosed cushion components when compared to similar articles formed of conventional foams and conventional foam stacks.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A three-dimensionally printed cushion component for use in an aircraft passenger seat, comprising:
   a resiliently deformable elastomeric lattice that is open celled and breathable, the resiliently deformable elastomeric lattice having a compressibility profile comprising a modulus of elasticity ranging from 0.1 to 0.8 and a compressive yield strength ranging from 0.35 kilograms to 1.8 kilograms;
   wherein the resiliently deformable elastomeric lattice has a first graduated compressibility profile along a first axis thereof and a second graduated compressibility profile along a second axis thereof, the first graduated compressibility profile different from the second graduated compressibility profile.

2. The cushion component of claim 1, wherein the resiliently deformable elastomeric lattice is a continuous layer comprising of a plurality of stacked and interconnected cuboid structures.

3. The cushion component of claim 2, wherein each cuboid structure of the plurality of stacked and interconnected cuboid structures has a unit cell length from 0.4 cm to 1.15 cm.

4. The cushion component of claim 3, wherein each cuboid structure of the plurality of stacked and interconnected cuboid structures comprises interconnecting struts each having a diameter from 0.04 cm to 0.09 cm.

5. The cushion component of claim 4, wherein each cuboid structure of the plurality of stacked and interconnected cuboid structures comprises one of a face-centered cube structure, a body-centered cube structure, and a kagome structure.

6. The cushion component of claim 1, wherein the resiliently deformable elastomeric lattice is anisotropic having greater strength throughout an entire first axial plane as compared to at least one other axial plane thereof.

7. An aircraft seat assembly, comprising:
   a seat cushion assembly including a resiliently deformable elastomeric lattice element that having an open celled, breathable construction, the seat cushion having a compressibility profile having a modulus of elasticity ranging from 0.1 to 0.8 and a compressive yield strength ranging from 0.35 kilograms to 1.8 kilograms;

wherein the seat cushion assembly has a first graduated compressibility profile along a first axis thereof and a second graduated compressibility profile along a second axis thereof, the first graduated compressibility profile different from the second graduated compressibility profile.

8. The aircraft seat assembly of claim 7, wherein the resiliently deformable elastomeric lattice comprises a predetermined formation of stacked and interconnected cuboid structures.

9. The aircraft seat assembly of claim 8, wherein each of the cuboid structures has a unit cell length between 0.4 cm to 1.15 cm.

10. The aircraft seat assembly of claim 8, wherein each of the cuboid structures comprises interconnecting struts each having a diameter between 0.04 cm to 0.09 cm.

11. The aircraft seat assembly of claim 8, wherein the cuboid structures are selected from the group consisting of face-centered cube structures, body-centered cube structures, and kagome structures.

\* \* \* \* \*